United States Patent
Lim et al.

(10) Patent No.: US 8,472,319 B2
(45) Date of Patent: Jun. 25, 2013

(54) RELAY STATION OPERATED ACCORDING TO QOS LEVEL OF SERVICE PACKET AND METHOD OF OPERATING RELAY STATION

(75) Inventors: Sunggook Lim, Bucheon-si (KR); Jung Min So, Suwon-si (KR); Mi-Sun Do, Suwon-si (KR); Jaiyong Lee, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 145 days.

(21) Appl. No.: 13/208,133

(22) Filed: Aug. 11, 2011

(65) Prior Publication Data

US 2011/0292867 A1    Dec. 1, 2011

Related U.S. Application Data

(62) Division of application No. 12/061,140, filed on Apr. 2, 2008, now Pat. No. 8,018,889.

(30) Foreign Application Priority Data

Jan. 2, 2008 (KR) .................................. 2008-429

(51) Int. Cl.
- *H04L 12/28* (2006.01)
- *H04J 1/10* (2006.01)
- *H04J 3/00* (2006.01)
- *H04W 4/00* (2009.01)
- *H04W 40/04* (2009.01)

(52) U.S. Cl.
USPC ........ 370/230.1; 370/315; 370/328; 370/345; 455/445

(58) Field of Classification Search
USPC ....... 370/229–239, 310–350; 455/422.1–431, 455/445–466
See application file for complete search history.

(56) References Cited

U.S. PATENT DOCUMENTS

| | | | |
|---|---|---|---|
| 7,003,311 B2 | 2/2006 | Ebata et al. | |
| 7,100,362 B2 | 9/2006 | Kato | |
| 7,664,093 B2 * | 2/2010 | Miyanaga et al. | 370/350 |
| 8,144,597 B2 * | 3/2012 | Senarath et al. | 370/238 |
| 2001/0046236 A1 * | 11/2001 | Ono et al. | 370/412 |
| 2005/0152289 A1 | 7/2005 | Nagata et al. | |
| 2006/0087974 A1 | 4/2006 | Ozer et al. | |
| 2006/0293061 A1 | 12/2006 | Kobayashi et al. | |
| 2008/0165699 A1 | 7/2008 | Wei | |
| 2009/0147731 A1 | 6/2009 | Chion et al. | |

FOREIGN PATENT DOCUMENTS

| | | |
|---|---|---|
| JP | 2007-104677 | 4/2007 |
| KR | 10-2002-0024935 | 4/2002 |
| KR | 10-0436365 | 6/2004 |
| KR | 10-0651261 | 11/2006 |
| KR | 10-0737678 | 7/2007 |

* cited by examiner

*Primary Examiner* — Tri H Phan
(74) *Attorney, Agent, or Firm* — NSIP Law

(57) ABSTRACT

A relay station, including a delay information storage unit to store remaining delay information generated in a path from a target relay node to a destination node; an order determination unit to determine an order of processing service packets with a plurality of quality of service (QoS) levels using the remaining delay information, the service packets being received from a neighbor node; and a processing unit to process the service packets in the determined order.

3 Claims, 7 Drawing Sheets

RELAY STATION OPERATED ACCORDING TO QOS LEVEL OF SERVICE PACKET AND METHOD OF OPERATING RELAY STATION

CROSS-REFERENCE TO RELATED APPLICATIONS

This application is a divisional of U.S. patent application Ser. No. 12/061,140, filed Apr. 2, 2008 now U.S. Pat. No. 8,018,889, in the United States Patent and Trademark Office. This application also claims the benefit of Korean Application No. 2008-429, filed Jan. 2, 2008, in the Korean Intellectual Property Office, the disclosures of which is incorporated herein by reference.

BACKGROUND OF THE INVENTION

1. Field of the Invention

Aspects of the present invention relate to a technology that enables a relay station belonging to a multi-hop network to predict delay which can be generated and to determine an order of processing service packets with a plurality of quality of service (QoS) levels.

2. Description of the Related Art

A relay station economically and efficiently extends a cell coverage of a base station and increases a data transmission rate. Accordingly, much research on a communication system using a relay station has been conducted. A technology related to a multi-hop network including a plurality of relay stations is coming into the spotlight. For example, the Institute of Electrical and Electronics Engineers (IEEE) 802.16e specifies details about a multi-hop network including a plurality of relay stations.

When configuring a multi-hop network using a plurality of relay stations, service packets transmitted from a source node are transmitted to a destination node via the plurality of relay stations. The plurality of relay stations processes the received service packets using various methods, and transmits the processed service packets to a neighboring relay station or the destination node. Delay is generated while each of the plurality of relay stations processes the service packets.

Each of the service packets can have quality of service (QoS) levels different from each other, and require a delay condition based on the QoS levels. For example, a delay condition required by a service packet A and a delay condition required by a service packet B may be different.

When a relay station receives a plurality of service packets, processing the plurality of received service packets based on the order in which the plurality of received service packets are received may be problematic. For example, a relay station may first receive a service packet A and then receives a service packet B. If the service packet B requires a more strict delay condition than the service packet A and the relay station processes the service packet A first, a delay condition required by the service packet B cannot be satisfied. Thus, a technology enabling a relay station to determine an order of efficiently processing received service packets based on QoS levels of the received service packets is desirable.

SUMMARY OF THE INVENTION

Aspects of the present invention provide a relay station and process of operating the relay station, including determining an order of processing service packets with various quality of service (QoS) levels based on a jitter condition or delay condition, thereby effectively satisfying a required condition depending on the QoS levels.

According to an aspect of the present invention, a relay station is provided. The relay station includes a delay information storage unit to store remaining delay information generated in a path from a target relay node to a destination node; an order determination unit to determine an order of processing service packets with a plurality of quality of service (QoS) levels using the remaining delay information, the service packets being received from a neighbor node; and a processing unit to process the service packets in the determined order.

According to an aspect of the present invention, a relay station is provided. The relay station includes a delay information storage unit to store an average delay value generated in a path from a source node to a target relay node; an order determination unit to determine an order of processing service packets based on the average delay value and actual delay information, the actual delay information being actually generated while received service packets with a plurality of QoS levels are transmitted; and a processing unit to process the service packets in the determined order.

According to an aspect of the present invention, a method of operating a relay station is provided. The method includes storing remaining delay information generated in a path from a target relay node to a destination node; determining an order of processing service packets with a plurality of QoS levels using the remaining delay information, the service packets being received from a neighbor node; and processing the service packets in the determined order.

According to an aspect of the present invention, a method of operating a relay station is provided. The method includes storing an average delay value generated in a path from a source node to a target relay node; determining an order of processing service packets based on the average delay value and actual delay information, the actual delay information being actually generated while received service packets with a plurality of QoS levels are transmitted; and processing the service packets in the determined order.

According to an aspect of the present invention, a method of collecting delay information of a base station is provided. The method includes transmitting, by the base station, a downlink delay measurement request message to child relay nodes of the base station; receiving, by the base station, a delay measurement reply message generated in response to the downlink delay measurement request message from the child relay nodes; and extracting, by the base station, downlink total delay information generated in a path from the base station to a terminal, based on the delay measurement reply message.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
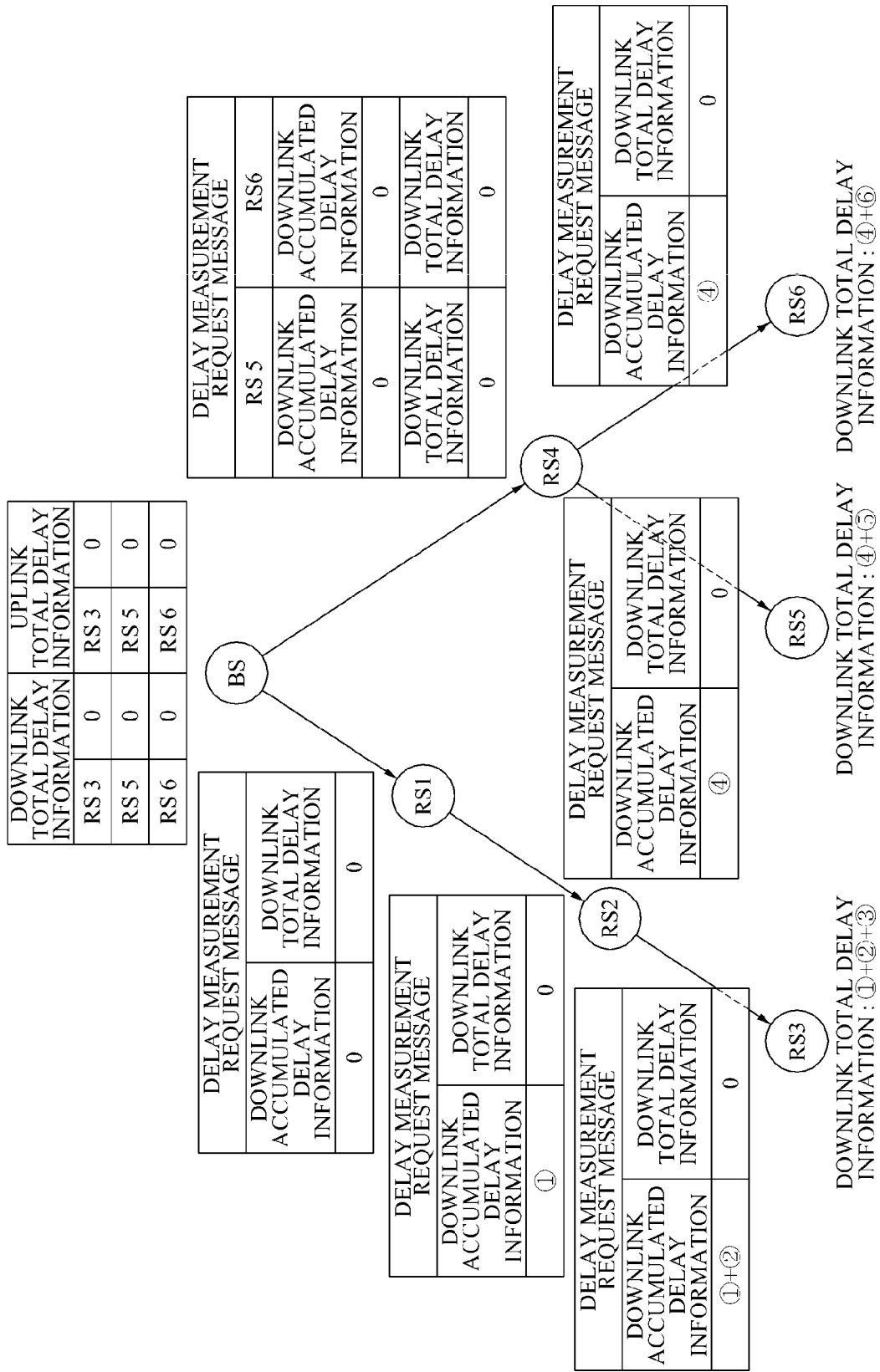
FIG. 1 illustrates an operation where each relay station (RS) measures downlink delay according to a delay measurement request message and transmits downlink accumulated delay information according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows an operation where each relay station (RS) measures a downlink delay according to a delay measurement request message and transmits downlink accumulated delay information according to an embodiment of the present invention. A base station (BS) manages total delay information generated in a path from the BS or the RS 3, the RS 5, and the RS 6, to terminals using a table. The total delay information stored in the table managed by the BS is initialized as 0.

The BS transmits the delay measurement request message to RS 1 and RS 4. The delay measurement request message transmitted from the BS includes downlink accumulated delay information and downlink total delay information. The downlink accumulated delay information and downlink total delay information are initialized as 0, and transmitted to the RS 1.

The RS 1 measures a queuing delay of the RS 1 in response to the delay measurement request message. If the queuing delay of the RS 1 is ①, the RS 1 sets the downlink accumulated delay information as ① and transmits the delay measurement request message to the RS 2. The downlink total delay information is maintained as 0.

The RS 2 measures the queuing delay of the RS 2 in response to the delay measurement request message transmitted from the RS 1. When the queuing delay of the RS 2 is ②, the RS 2 updates the downlink accumulated delay information of the RS 1 with ①+②. The RS 2 transmits the delay measurement request message, including the updated downlink accumulated delay information and downlink total delay information, to the RS 3.

The RS 3 measures the queuing delay of the RS 3 in response to the delay measurement request message transmitted from the RS 2. The RS 3 also calculates downlink total delay information using the downlink accumulated delay information updated by the RS 2. If the queuing delay of the RS 3 is ③, the downlink total delay information is calculated as ①+②+③.

The RS 4 receives the delay measurement request message transmitted from the BS. The delay measurement request message includes downlink accumulated delay information and downlink total delay information with respect to a terminal connected to the RS 5, and downlink accumulated delay information and downlink total delay information with respect to a terminal connected to the RS 6.

The RS 4 measures queuing delay of the RS 4, updates the downlink accumulated delay information with ④, and transmits the delay measurement request message to the RS 5 and the RS 6. The RS 5 measures queuing delay of the RS 5 in response to the delay measurement request message transmitted from the RS 4, and calculates downlink total delay information. If the queuing delay of the RS 5 is ⑤, the downlink total delay information is calculated as ④+⑤. Like the RS 5, the RS 6 measures the queuing delay of the RS 6, and calculates the downlink total delay information as ④+⑥. Accordingly, the RS 3, the RS 5, and the RS 6 can calculate the respective downlink total delay information.

Figure 2:
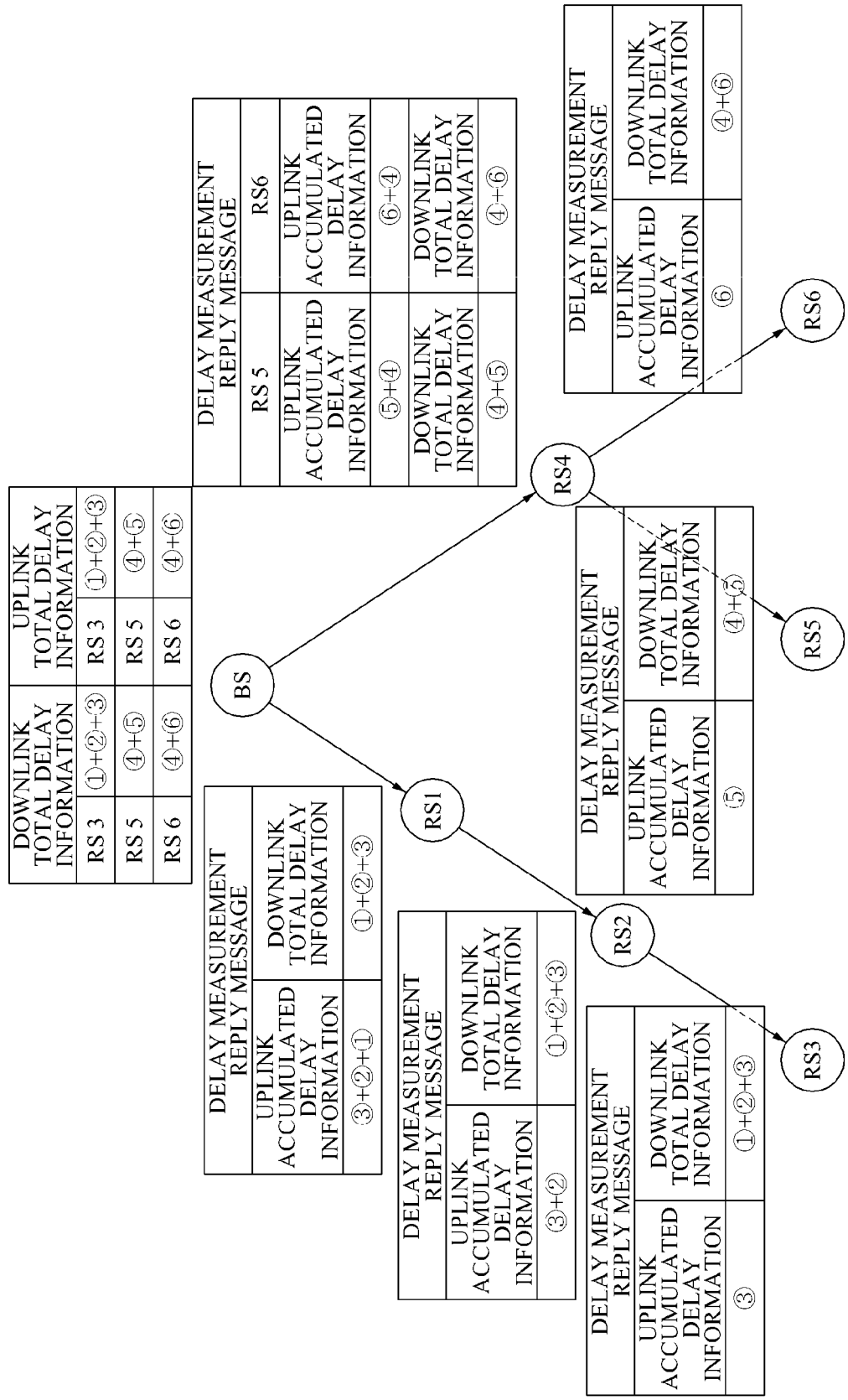
FIG. 2 illustrates an operation where each RS transmits downlink total delay information and uplink accumulated delay information using a delay measurement reply message according to an embodiment of the present invention.

FIG. 2 shows an operation where each RS transmits downlink total delay information and uplink accumulated delay information using a delay measurement reply message according to an embodiment of the present invention. The RS 3 transmits a delay measurement reply message to the RS 2. When the RS 3 calculates downlink total delay information as ①+②+③, the RS 3 transmits the calculated downlink total delay information, ①+②+③, to the RS 2. The RS 3 measures queuing delay occurring when RS 3 performs an uplink communication, and transmits the measured queuing delay as uplink accumulated delay information to the RS 2. When the RS 3 performs the uplink communication, the queuing delay of RS 3 is ③.

The RS 2 measures the queuing delay occurring when the RS 2 performs an uplink communication in response to the delay measurement reply message transmitted from RS 3. The RS 2 also updates the uplink accumulated delay information with ③+②, and transmits the updated uplink accumulated delay information to RS 1. The RS 2 transmits downlink total delay information transmitted from the RS 3, ①+②+③, to the RS 1.

The RS 1 measures the queuing delay occurring when the RS 1 performs the uplink communication in response to the delay measurement reply message. The RS 1 also updates the uplink accumulated delay information with ③+②+①, and transmits the updated uplink accumulated delay information and the downlink total delay information, ①+②+③, to the BS.

The RS 5 transmits downlink total delay information, ④+⑤, and queuing delay ⑤ occurring when the RS 5 performs the uplink communication, to the RS 4. Similarly, the RS 6 transmits downlink total delay information, ④+⑥, and the queuing delay ⑥ occurring when the RS 6 performs the uplink communication, to the RS 4.

The RS 4 receives the delay measurement reply message transmitted from the RS 5 and the RS 6. The RS 4 ascertains that the downlink total delay information associated with the RS 5 and the RS 6 is ④+⑤ and ④+⑥, respectively, through the delay measurement reply message. The RS 4 measures the queuing delay ④ occurring when the RS 4 performs the uplink communication in response to the delay measurement reply message. The RS 4 updates the uplink accumulated delay information ⑤ transmitted from the RS 5, with ⑤+④, and updates the uplink accumulated delay information ⑥ transmitted from the RS 6, with ⑥+④. The RS 4 transmits the delay measurement reply message to the BS. Accordingly, the BS can collect the downlink total delay information and uplink total delay information associated with each of the RS 3, the RS 5, and the RS 6.

The BS may then transmit the collected downlink total delay information and uplink total delay information to all child relay nodes RS 1, RS 2, RS 3, RS 4, RS 5, and RS 6. Accordingly, all child relay nodes RS 1, RS 2, RS 3, RS 4, RS 5, and RS 6 can recognize the downlink total delay information and uplink total delay information. Further, since all of the child relay nodes RS 1, RS 2, RS 3, RS 4, RS 5, and RS 6 can recognize the downlink total delay information and uplink total delay information, remaining delay information can be ascertained.

For example, when a downlink communication is performed, the downlink total delay information generated in a path from the BS to a terminal connected to the RS 3 is ①+②+③. Since downlink accumulated delay information collected by the RS 2 is ①, remaining delay information of RS 2 is ②+③. The remaining delay information of the RS 2 is associated with remaining delay generated in a path from the RS 2 to the terminal connected to the RS 3. As another example, when the downlink communication is performed, the remaining delay information of the RS 1 is identical to the downlink total delay information, ①+②+③. Accordingly, since each of the child relay nodes RS 1, RS 2, RS 3, RS 4, RS 5, and RS 6 ascertains the downlink total delay information, uplink total delay information, downlink accumulated delay information, and uplink accumulated delay information, the remaining delay information of each of the child relay nodes RS 1, RS 2, RS 3, RS 4, RS 5, and RS 6 can be ascertained.

When receiving service packets, each of the child relay nodes RS 1, RS 2, RS 3, RS 4, RS 5, and RS 6 can predict delay that may occur with respect to the received service packets through the remaining delay information. Thus, each of the child relay nodes RS 1, RS 2, RS 3, RS 4, RS 5, and RS 6 may predict the delay with respect to the received service packets through the remaining delay information, and thereby can efficiently satisfy a delay condition required by the service packets.

Figure 3:
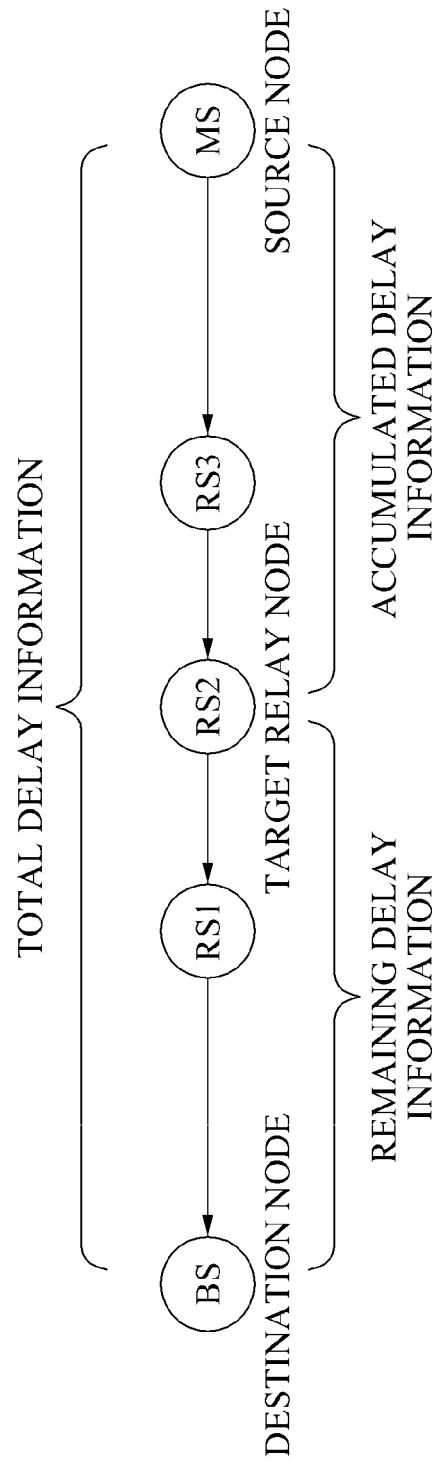
FIG. 3 conceptually illustrates remaining delay information and accumulated delay information with respect to a target relay node according to an embodiment of the present invention.

FIG. 3 shows remaining delay information and accumulated delay information with respect to a target relay node according to an embodiment of the present invention. The BS and a terminal (MS) perform an uplink communication as shown in FIG. 3. When the uplink communication is performed, the BS corresponds to a destination node, and the terminal corresponds to a source node. When a downlink communication is performed, the BS corresponds to the source node, and the terminal corresponds to the destination node.

The RS 1, the RS 2, and the RS 3 configuring multi-hops are between the source node and the destination node. A service packet transmitted from the source node is transmitted to the destination node via the RS 1, the RS 2, and the RS 3. A queuing delay occurs while transmitting the service packet. When a plurality of service packets with a plurality of quality of service (QoS) levels is transmitted from the source node, each of the RS 1, the RS 2, and the RS 3 determines an order of processing the service packets using previously stored remaining delay information. The RS 1, the RS 2, and the RS 3 can each determine the order based on a delay condition required by each of the service packets.

In the example shown in FIG. 3, the RS 2, as a target relay node, determines the order of the received service packets. The RS 2 previously stores accumulated delay information and total delay information. The accumulated delay information is generated in a path from the source node to the RS 2. The total delay information is generated in a path from the source node to the destination node. The total delay information can be uplink total delay information or downlink total delay information, and the accumulated delay information can be uplink accumulated delay information or downlink accumulated delay information. The RS 2 can calculate remaining delay information based on the accumulated delay information and total delay information.

The RS 2 compares the delay condition required by each of the service packets and the remaining delay information, and determines a likelihood of violating the delay condition. Accordingly, the RS 2 can determine the order using a result of the determination. For example, the RS 2 sequentially receives a service packet A, a service packet B, and a service packet C. The RS 2 can determine a likelihood of violating a delay condition required by each of the service packets A, B, and C using remaining delay information. If the service packet C has the highest likelihood of violating the delay condition and the service packet A has the lowest likelihood of violating the delay condition, the RS 2 can determine the order of packet transmission as the service packet C, then the service packet B, and finally the service packet A.

The delay required according to a QoS level of a service packet received by the RS 2 is $t_{req}$, the remaining delay information of the RS 2 is $t_r$, and the delay actually generated while the service packet is transmitted from a source node to the RS 2 is $t_s$. The RS 2 can ascertain a time stamp location of the received service packet using time-stamping of the source node with respect to the service packet, and thereby can ascertain delay actually generated. A likelihood of violating the delay condition can be determined using Equation 1:

$$K = \{t_{req} - (t_r + t_s)\}. \quad \text{[Equation 1]}$$

The smaller the value of K, the higher the likelihood of violating the delay condition. When the RS 2 receives n service packets, in order to determine the likelihood, the RS 2 may calculate $K_n$, with respect to each of the n service packets. $K_n$, is determined as Equation 2:

$$K_n = \{t_{req\_n} - (t_{r\_n} + t_{s\_n})\}. \quad \text{[Equation 2]}$$

Here, n is a natural number and an index of each of the n service packets.

Figure 4:
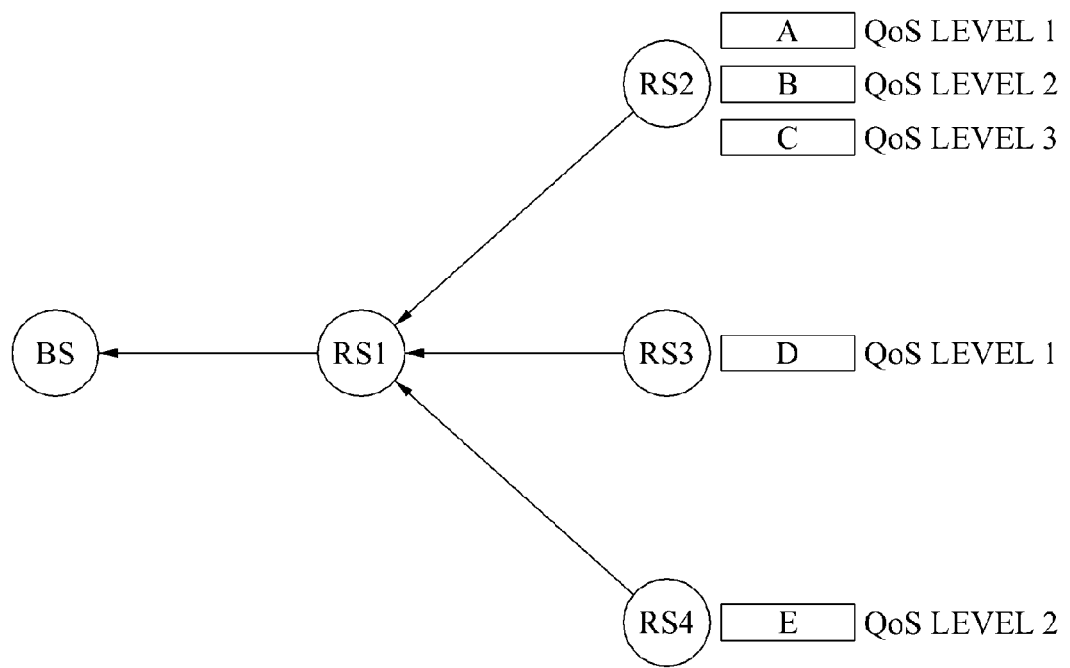
FIG. 4 conceptually illustrates that a target relay node processes service packets with a variety of quality of service (QoS) levels according to an embodiment of the present invention.

FIG. 4 shows a target relay node processes service packets with a variety of QoS levels according to an embodiment of the present invention. The RS 1, which is the target relay node, receives a plurality of service packets from the RS 2, the RS 3, and the RS 4. The RS 1 receives a service packet A with a QoS level 1, a service packet B with a QoS level 2, and a service packet C with a QoS level 3 from RS 2. The RS 1 also receives a service packet D with the QoS level 1 from the RS 3, and receives a service packet E with the QoS level 2 from the RS 4.

The RS 2 can determine an order of processing the service packets A, B, C, D, and E according to a likelihood of violating a delay condition required by each of the service packets A, B, C, D, and E, not according to an order in which the service packets A, B, C, D, and E are received. For example, although the service packet E is received last, when the likelihood of violating the delay condition is high since the delay condition required by the service packet E is strict, RS 2 can first process the service packet E. Thus, an RS which efficiently satisfies a delay condition can be provided.

Figure 5:
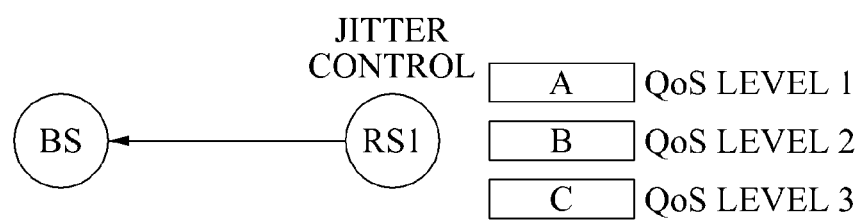
FIG. 5 conceptually illustrates that a target relay node processes service packets with a variety of QoS levels considering a jitter condition according to an embodiment of the present invention.

FIG. 5 shows a target relay node processing service packets with a variety of QoS levels based on a jitter condition, according to an embodiment of the present invention. The RS 1 receives a service packet A with a QoS level 1, a service packet B with a QoS level 2, and a service packet C with a QoS level 3. The RS 1 processes and transmits the received service packets A, B, and C to a BS. Since each of the service packets A, B, and C has the QoS level 1, QoS level 2, and QoS level 3, respectively, a jitter condition required by each of the service packets A, B, and C may be different. The jitter condition is a condition about a range where delay of the received service packet changes.

According to aspects of the present invention, the target relay node processing the service packets A, B, and C based on the jitter condition is a final relay node. Specifically, when an uplink communication is performed, the target relay node may be a relay node connected to the BS. When a downlink communication is performed, the target relay node may be a relay node connected to a terminal MS.

The RS 1 may determine a likelihood of violating a jitter condition required by each of the service packets A, B, and C using a value $M_n$, represented as Equation 3:

$$M_n = \{D(t)_{m\_n} - t_{s\_n} + x_n\},$$

$$D(t)_{m\_n} = aD(t-1)_{m\_n} + (1-a)t_{s\_n}. \quad \text{[Equation 3]}$$

Here, n is an index of a service packet, a is an actual number from 0 to 1, $D(t)_{m\_n}$ is an average delay value of a service packet n at the current point in time, $D(t-1)_{m\_n}$ is an average delay value of a service packet n at a previous point in time, $t_{s\_n}$ is actual delay of the service packet n, and $x_n$ is a jitter condition required by the service packet n.

Referring to Equation 3, the RS 1 may calculate $M_A$, $M_B$, and $M_C$ with respect to each of the service packets A, B, and C. The RS 1 processes the service packets A, B, and C in an order from the smallest of $M_A$, $M_B$, and $M_C$. For example, although the RS 1 sequentially receives the service packets A, B, and C, the RS 1 can determine the order as the service packet C, then the service packet B, and finally the service packet A.

Figure 6:
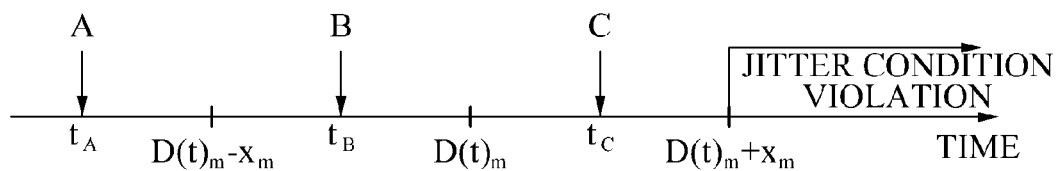
FIG. 6 conceptually illustrates an average delay value and time when a target relay node receives a service packet A, service packet B, and service packet C according to an embodiment of the present invention.

FIG. 6 shows an average delay value and time when a target relay node receives a service packet A, a service packet B, and a service packet C, according to an embodiment of the present invention. The service packet A with actual delay corresponding to time $t_A$, the service packet B with actual delay corresponding to time $t_B$, and the service packet C with actual delay corresponding to time $t_C$, arrive at the target relay node. Although not necessarily true in all aspects of the present invention, for convenience of description, it is assumed that the average delay value with respect to each of the service packets A, B, and C is the same $D(t)_m$, and a jitter condition with respect to each of the service packets A, B, and C is the same $x_n$.

As shown in FIG. 6, the service packet A arrives at the target relay node too early. The target relay node processes the service packet A after holding the service packet A during $D(t)_m - t_A$. The target relay node calculates $M_B$ and $M_C$ with respect to each of the service packet B and the service packet C. Since $M_C$ is less than $M_B$, the target relay node processes the service packet C prior to the service packet B.

Figure 7:
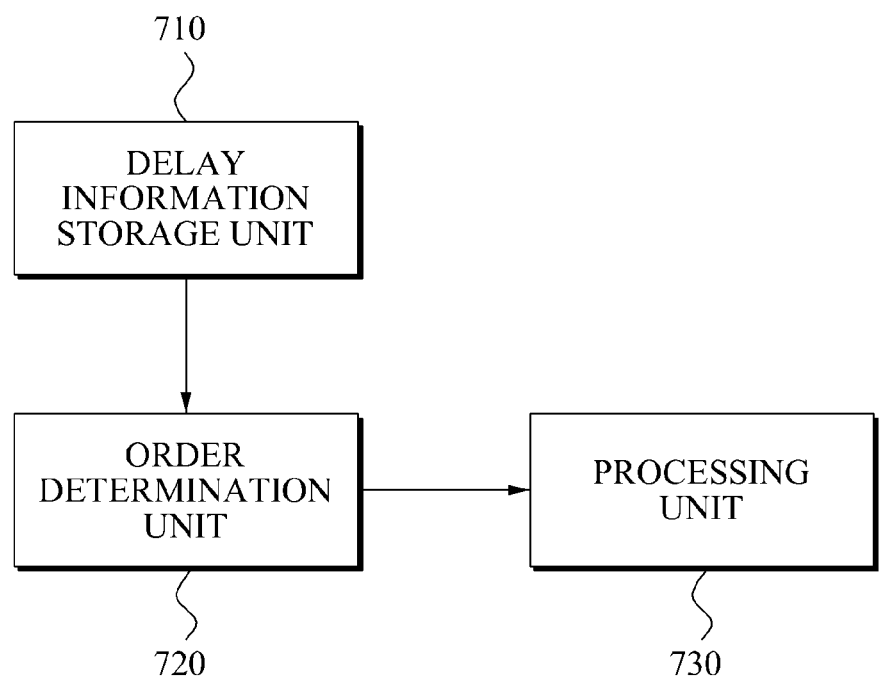
FIG. 7 illustrates a configuration of an RS according to an embodiment of the present invention.

FIG. 7 shows a configuration of an RS according to an embodiment of the present invention. The RS includes a delay information storage unit 710, an order determination unit 720, and a processing unit 730. According to other aspects of the present invention, the RS may include additional and/or different units. Similarly, the functionality of two or more of the above units may be integrated into a single component.

First, an RS which processes service packets considering a required delay condition is described.

The delay information storage unit 710 stores remaining delay information generated in a path from a target relay node to a destination node. The delay information storage unit 710 may store the remaining delay information calculated based on a difference between total delay information and accumulated delay information. The total delay information is generated in a path from a source node to the destination node, and the accumulated delay information is generated in a path from the source node to the target relay node. The delay information storage unit 710 may also update the remaining delay information at predetermined times, and store the generated remaining delay information.

The order determination unit 720 determines an order of processing service packets with a plurality of QoS levels using the remaining delay information. The service packets are received from a neighbor node. The order determination unit 720 may also determine a likelihood of violating a delay condition using the remaining delay information, and determine the order according to the determined likelihood. The delay condition is required by each of the service packets. The order determination unit 720 may determine the order from the highest possibility of violating the delay condition to the lowest. The order determination unit 720 may determine the order based on actual delay information actually generated while the service packets are transmitted from the source node to the target relay node.

The processing unit 730 processes the service packets in the determined order.

Second, an RS which processes service packets considering a jitter condition is described using the same FIG. 7. Here, the delay information storage unit 710 stores an average delay value generated in a path from a source node to a target relay node. The delay information storage unit 710 can update the average delay value at predetermined times.

The order determination unit 720 determines an order of processing the service packets based on the average delay value and actual delay information. The actual delay information is actually generated while received service packets with a plurality of QoS levels are transmitted. The order determination unit 720 may also determine a likelihood of violating the jitter condition using the average delay value and the actual delay information, and determine the order according to the determined likelihood. The jitter condition is required by each of the service packets.

The order determination unit 720 may calculate an actual jitter with respect to each of the service packets using the average delay value and the actual delay information, and determine the order using the calculated actual jitter. The processing unit 730 processes the service packets in the determined order.

Aspects of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, it would be appreciated by those skilled in the art that changes may be made in this embodi-

What is claimed is:

1. A method of collecting delay information of a base station, the method comprising:
   transmitting, by the base station, a downlink delay measurement request message to child relay nodes of the base station;
   receiving, by the base station, a delay measurement reply message generated in response to the downlink delay measurement request message from the child relay nodes; and
   extracting, by the base station, downlink total delay information generated in a path from the base station to a terminal, based on the delay measurement reply message,
   wherein each of the child relay nodes transmits downlink delay information of each of the child relay nodes to respective lower node of each of the child relay nodes, the downlink delay information being sequentially generated in response to the downlink delay measurement request message, and a final relay node of the child relay nodes generates the delay measurement reply message including the downlink total delay information generated based on the downlink delay information of each of the child relay nodes.

2. The method of claim 1, further comprising:
   extracting, by the base station, uplink total delay information generated in a path from the terminal to the base station, based on the delay measurement reply message;
   wherein each of the child relay nodes sequentially generates uplink delay information of each of the child relay nodes in response to the delay measurement reply message, and transmits the delay measurement reply message including the uplink delay information of each of the child relay nodes to an upstream node of each of the child relay nodes.

3. The method of claim 2, further comprising:
   transmitting, by the base station, the uplink total delay information to the child relay nodes.

* * * * *